United States Patent [19]

Rigg et al.

[11] Patent Number: 4,568,428

[45] Date of Patent: Feb. 4, 1986

[54] METHOD AND APPARATUS FOR VACUUM DISTILLATION

[75] Inventors: Timothy J. Rigg, Mt. Vernon; Frank Anderson, Urbana; Richard Curtin, Mt. Vernon, all of Ill.

[73] Assignee: General Signal Corporation, Stamford, Conn.

[21] Appl. No.: 510,832

[22] Filed: Jul. 5, 1983

[51] Int. Cl.$^4$ .............................................. B01D 3/10
[52] U.S. Cl. ....................................... 203/91; 203/1; 203/2; 203/90; 203/98; 203/DIG. 18; 202/160; 202/177; 202/181; 202/185 R; 202/205; 202/236
[58] Field of Search .......... 203/1, 2, 14, 91, DIG. 25, 203/90, 98, DIG. 18; 202/160, 177, 181, 236, 205, 235, 185 R; 208/355, 359, 368, 366; 196/98

[56] References Cited

U.S. PATENT DOCUMENTS

| | | | |
|---|---|---|---|
| 2,901,425 | 8/1959 | Waddill | 208/366 |
| 3,454,471 | 7/1969 | Kehoe | 203/90 |
| 3,577,320 | 5/1971 | Randell | 203/91 |
| 3,803,005 | 4/1974 | Miserlis et al. | 203/98 |
| 3,893,893 | 7/1975 | Miserlis et al. | 203/98 |
| 3,894,942 | 7/1975 | Mair | 208/368 |

FOREIGN PATENT DOCUMENTS 0659597  5/1979  U.S.S.R. ............................. 208/366

Primary Examiner—S. Leon Bashore
Assistant Examiner—V. Manoharan
Attorney, Agent, or Firm—Oblon, Fisher, Spivak, McClelland & Maier

[57] ABSTRACT

A vapor distillation system sprays a mixture of liquids to be distilled into an evacuated vaporizer chamber. The low boiling point components of the mixture will be vaporized while the remainder of the mixture will collect at the bottom of the vaporizer chamber. The collected liquid is recirculated and heated. The recirculating liquid is discharged, and fresh mixture is introduced, as a function of the sensed temperature of the recirculating liquid. The vapor is transferred to a condenser chamber having a water spray head so that the chilled spray condenses the vapor. Both the condenser chamber and the vaporizer chamber have fluid level control systems.

14 Claims, 1 Drawing Figure

METHOD AND APPARATUS FOR VACUUM DISTILLATION

BACKGROUND OF THE INVENTION

1. Field of the Invention

The present invention is directed to a method and apparatus for the distillation of a liquid from a liquid mixture, in which the liquids contained in the mixture have different boiling points. More specifically, the present invention is directed to a method and apparatus for such distillation wherein both evaporization and condensation of the vaporated liquid are accomplished by spraying the mixture within an evacuated chamber.

2. Description of the Prior Art

It has been known to distil components from a liquid mixture composed of liquids having different boiling points. However, in known distillation methods, the distillation process can be complicated by similarity of the boiling points of the components being distilled. Moreover, since the mixture must be heated, the known processes are limited to use with mixtures having components exhibiting good temperature stability. The need to heat the mixture also requires the expenditure of large amounts of heat energy in the distillation process.

SUMMARY OF THE INVENTION

It is an object of the present invention to provide a method and apparatus for the selective distillation of liquids in a mixture by spraying the mixture within an evacuated chamber and by spray condensation.

It is a further object of the present invention to provide a method and apparatus for the selective distillation of liquids with a reduced input of heat energy.

According to the present invention, a liquid mixture to be distilled, such as transformer oil containing water, is heated and sprayed into the top of an evacuated chamber defined by a sealed vessel. The large surface area of the fine spray droplets results in a rapid vaporization of the more volatile components of the mixture. Moreover, the evacuation of the chamber results in the volatile elements vaporizing at a lower temperature than at atmospheric pressure. The remaining liquid mixture is collected at the bottom of the vessel and recirculated to a heater and back to the spray nozzle in the vaporizer chamber.

The vaporizer chamber is in vapor communication with an evacuated condensation chamber defined by a second sealed vessel. Cooled water is sprayed in the top of the condensation chamber, which promotes the condensation of the water vapor from the vaporizer chamber. The condensed water is collected at the bottom of the condensation vessel, is cooled and recirculated to the spray nozzle in the condensation chamber.

Both the vaporizer and condenser chamber have liquid level detecting and controlling means and the like which discharge collected liquid at the bottom thereof when the liquid therein has reached a predetermined level.

A fresh mixture is introduced into the recirculation circuit for the vaporizer by a pump including a bypass loop. The pump is connected to the recirculation circuit, via a valve, at a point upstream from the heater. The valve is controlled by a temperature controller including a sensor downstream from the heater. The temperature controller closes the valve to limit the introduction of fresh mixture when the temperature of the mixture entering the spray head of the vaporizer chamber falls. Therefore, the introduction of heat energy is limited to the heater in the recirculation circuit for the vaporizer chamber.

BRIEF DESCRIPTION OF THE DRAWING

Various other objects, features and attendant advantages of the present invention will be more fully appreciated as the same becomes better understood from the following detailed description when considered in connection with the accompanying drawing wherein.

DETAILED DESCRIPTION OF THE PREFERRED EMBODIMENT

Figure 1:
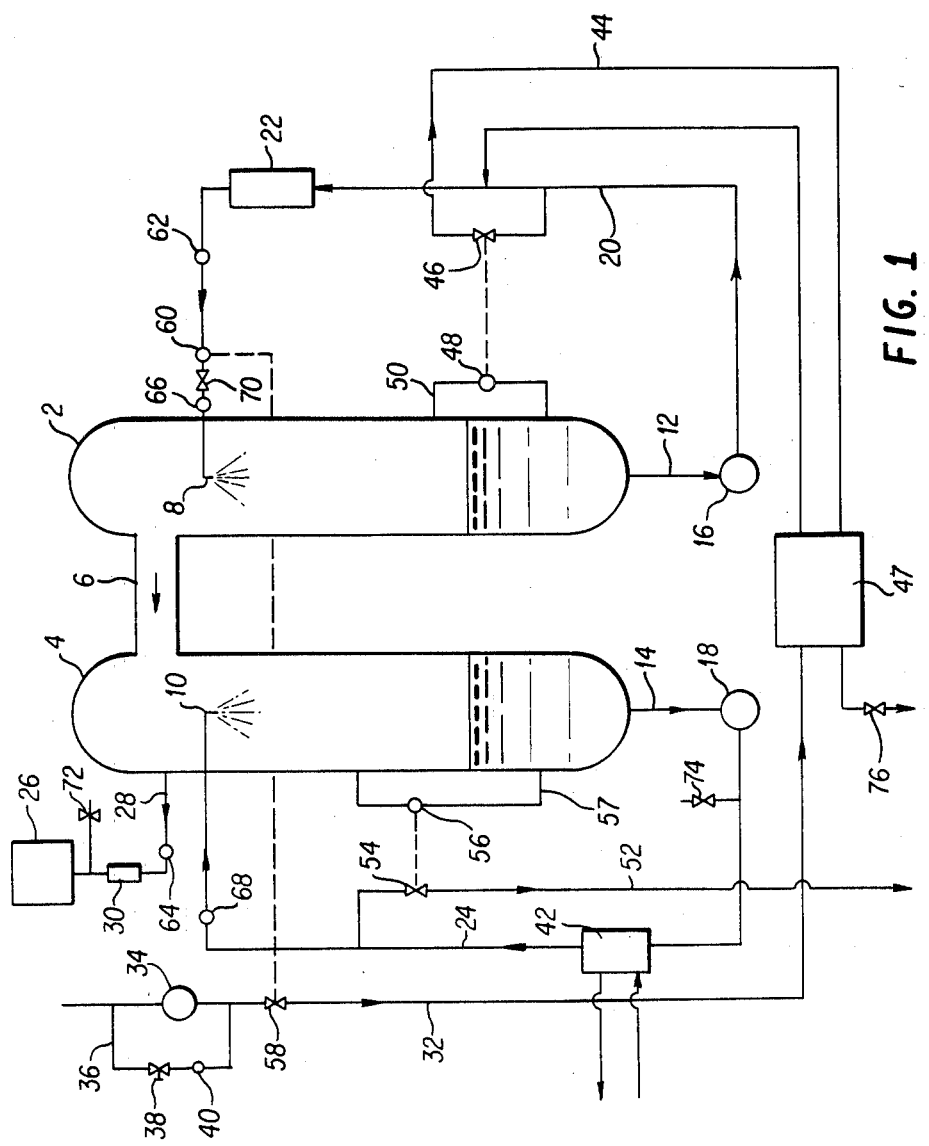
FIG. 1 is a schematic illustration of the preferred embodiment of the system of the present invention.

The present invention will now be described with reference to the attached figure.

FIG. 1 illustrates an embodiment of the system of the present invention which is useful for distilling liquids having good lubrication properties, such as water. A vaporizer tank 2 and a condenser tank 4 are formed by sealed tanks. A conduit 6 communicates the tops of the tanks 2 and 4 so that vapors can pass therebetween. A spray head 8 is positioned near the top of the vaporizer tank 2 and a spray head 10 is positioned near the top of the condenser tank 4. The spray heads have small nozzle openings which permit the discharge of a fine spray therefrom. A discharge conduit 12 communicates with the bottom of the vaporizer tank 2 while a discharge conduit 14 communicates with the bottom of the condenser tank 4. A recirculation pump 16 is located in the discharge conduit 12 while a recirculation pump 18 is located in the discharge conduit 14.

The discharge from the recirculation pump 16 is directed into a vaporizer recirculation conduit 20. The recirculation conduit 20 includes an in-line heater 22 which can, for example, be a 20 kilowatt heater having an integral adjustable thermostat. The recirculation conduit connects the recirculation pump 16 to the spray head 8 within the vaporizer tank. Therefore, when the recirculation pump 16 is operating, liquid collected at the bottom of the vaporizer tank is recirculated through the heater 22 and into the sprayhead 8, from which it is sprayed as a fine mist into the vaporizer tank.

A recirculation conduit 24 is connected between the recirculation pump 18 of the condenser tank 4 and the spray head 10 of the condenser tank 4 for recirculated liquid between the bottom of the tank 4 and the spray head 10.

A vacuum pump 26 is connected to the condenser tank via the conduit 28 having an in-line condenser 30.

A liquid mixture, such as a mixture of transformer oil and water, is introduced through the feed conduit 32. A feed pump 34 is positioned in-line within the conduit. A bypass conduit 36 is connected to the feed conduit 32 at the upstream and downstreams ends of the feed pump 34. The bypass conduit includes a manually actuated valve 38 and a pressure sensor 40. The feed conduit 32 connects to the recirculation conduit 20 of the vaporizer tank at a point upstream from the heater 22. A heat exchanger 42 is positioned to provide heat exchange between the recirculation conduit 24 of the condenser tank and a source of chilled fluid (not shown). The heat exchanger 42 transfers residual heat from the liquid recirculating in the recirculation conduit 24 to the chilled fluid so as to chill the recirculating liquid.

An outflow conduit 44 has one end communicating with the recirculation conduit 20 of the vaporizer tank at a position upstream from the introduction of the feed mixture from the feed conduit 32. The outflow conduit 44 discharges recirculating liquid to a residual liquid storage tank (not shown). The discharge of liquid through the outflow conduit 44 is controlled by a valve 46 positioned in the outflow conduit 44. A second heat exchanger 47 extends between the outflow conduit 44 and the feed conduit 32 for further preheating the feed mixture by use of the residual heat in the discharged recirculating liquid.

According to the present invention, a level detector and controller 48 is positioned in a level control loop 50 of the vaporizer tank 2. The level detector and controller 48 provides a signal which controls the opening of valve 46 in the outflow conduit 44 so that the level of liquid at the bottom of the tank 2 remains constant.

An outflow conduit 52 is positioned in the recirculation conduit 24 of the condenser tank. The outflow conduit 52 is opened and closed by an in-line valve 54 and discharges liquid to a distilled liquid storage tank (not shown). The condenser tank 4 also includes a level controller 56 in a level detector and control loop 57. The level detector and controller 56 provides a signal which controls the opening of the valve 54 so that the level of the liquid in the bottom of the condenser tank 4 remains substantially constant.

A valve 58 is positioned in the feed conduit at a point immediately downstream from the feed pump 34. A temperature controller/sensor 60 is positioned in the recirculation of conduit 20 at a point between the heater 22 and the spray head 8. The temperature controller/sensor 60 senses the temperature of the recirculating liquid at a point downstream from the heater 22. The temperature controller/sensor is connected to the valve 58 and operates to provide a signal so as to reduce the opening of the valve 58 as the sensed temperature in the recirculation conduit 20 drops, and to increase the opening of the valve 58 as said sensed temperature increases.

Elements 62 and 64 are pressure gauges. Elements 66 and 68 are temperature gauges. Element 70 is a manual back pressure adjustment valve in the recirculation conduit 20. Element 72 is a manual vacuum release valve for the vacuum pump. Element 74 is a manual sampling valve for the recirculation conduit 24. Element 76 is a manual oil output shut-off valve in the oil outflow conduit 44.

This embodiment of the present invention operates as follows. The condenser tank initially contains water at the bottom thereof at the desired predetermined level so that a 15 gallon·reservoir exists at the bottom of the condenser tank 4. The recirculation pump 18 is then turned on which recirculates the water through the recirculation conduit 24 to the spray head 10 so that the water is sprayed as a fine mist within the condenser tank 4. The vacuum pump 26 is then turned on and a vacuum of approximately 18 inches of mercury is pulled within the tanks 2 and 4. The condenser 30 of the vacuum pump condenses the moisture initially in the atmosphere.

The vaporizer tank 2 initially contains a mixture of transformer oil and water at the bottom, with the level of the mixture being maintained at 15 gallons by the level detector and controller 48. The recirculation pump 16 is then turned on, which pumps the mixture through the recirculation conduit 20 and past the heater 22 so that it is sprayed into the vaporizer tank in the form of a fine heated mist. A portion of the heated mixture will evaporate in the relative vacuum existing within the vaporizer tank. Because water has a much lower boiling point than does transformer oil, substantially all of the vapor will be water vapor. Moreover, because of the relatively low pressure within the tanks, a high percentage of the water will vaporize at a much lower temperature than would be necessary at atmospheric pressure. If the two liquids of the mixture had similar boiling points, the reduced pressure would provide greater mutual separation for their boiling points.

The droplets containing the transformer oil and the remaining water will fall to the bottom of the tank. The mixture, which has been partially stripped of water, will then be recirculated through the recirculation conduit 20 and further heated in the heater 22. The mixture, at a higher temperature than in the first pass, will again be sprayed from the spray head 8 and additional water will be stripped from the mixture.

As the mixture is being recirculated by the recirculation pump 16, additional mixture is being introduced by the feedpump 34 through the feed conduit 32. At the same time, the level detector and controller 48 maintains the level of the mixture at the bottom of the vaporizer tank 2 at a constant level, in the following manner. When the system is first started, the temperature controller/sensor 60 senses that the temperature of the mixture in the recirculation conduit 20 is below a preset temperature, such as 300° F., which is desirable for vaporizing the water but which is below the boiling point of the transformer oil at the vacuum within the tanks. The sensed low temperature causes the temperature controller/sensor 60 to send a signal to the valve 58 which shuts the feed conduit 32. Therefore, the feed pump 34 pumps the fresh mixture through the bypass conduit 36 with little, or no, mixture reaching the recirculation conduit 20. Therefore, the liquid level at the bottom of the vaporizer tank 2 remains constant.

As the mixture is the recirculation conduit passes through the heater 22, heat is added which tends to raise the temperature of the mixture. However, the evaporation of the water in the mixture being sprayed from the spray head 8 requires heat which is drawn from the spray liquid droplets. Therefore, the temperature of the recirculating mixture only slowly increases. However, as the mixture recirculating in the recirculation conduit becomes stripped of water, the amount of evaporation decreases. As a result, the temperature sensed by the temperature controller/sensor 60 increases. This causes the controller/sensor 60 to provide a signal to the valve 58 for opening the feed conduit 32.

As additional fresh mixture is introduced into the recirculation conduit 20 through the feed conduit 32, the level of stripped mixture at the bottom of the vaporizer tank 2 increases. The increased level is sensed by the level detector and controller 48 which opens the valve 46, thereby permitting the mixture, which has been substantially stripped of water, to be discharged through the outflow conduit 44. Since the outflow conduit 44 connects to the recirculation conduit 20 at a point upstream from the feed conduit 32, only the substantially stripped mixture from the vaporizer tank is introduced into the outflow conduit 44. The discharged oil in the outflow conduit 44 passes through heat exchanger 47, which transfers some of the residual heat in the discharged oil to the incoming mixture in feed conduit 32. The discharged oil is then transferred to an oil storage tank.

The introduction of the fresh mixture from the feed conduit 32, which is replacing the stripped oil being discharged through the outflow conduit 44, as controlled by the level detector and controller 48, contains substantial amounts of water and will thus result in substantially higher levels of vaporization. As a result, the temperature of the mixture in the vaporizer tank will drop and this reduced temperature is sensed by the temperature controller/sensor 60, resulting in the partial closing of the valve 58 of the feed conduit 32. Further recirculation occurs and the opening of the valve 58 is successively increased and decreased depending upon the amount of water remaining in the mixture. The 15 gallon liquid reservoir maintained by the level detector and controller 48 at the bottom of the vaporizer tank 2 ensures that any given quantity of the mixture will have several passes through the vaporizer and will be substantially stripped.

If the valve 58 is manually closed, the system will continue to run in a stand-by state with the mixture pumped by the feed pump 34 being recirculated through the bypass conduit 36.

The water vapor in the vaporizer tank 2 can pass through the conduit 6 into the condenser tank 4. Here, the vapor is chilled by the relatively cold water droplets being discharged from the spray head 10. The vapor transfers heat to the droplets and condenses onto the falling droplets as well as on the walls of the condenser tank itself. As in the vaporization, by subdividing the mixture into fine droplets, the condensation step creates a large surface area for heat transfer from the condensing water and a resulting high rate of heat transfer from the vapor to the sprayed droplets. As a result, the condensation efficiency is greatly increased.

The sprayed and condensed water falls to the bottom of the tank, which is maintained with a 15 gallon reservoir by the level detector and controller 56. The level detector and controller 56 controls the opening of the valve 54 in the outflow conduit 52 of the condenser tank.

The water at the bottom of the condenser tank 4 is recirculated through the recirculation conduit 24 by the recirculation pump 18. A portion of the sensible heat transferred to the reservoir water from the condensing vapor is transferred to the incoming mixture in the feed line 32 at the heat exchanger 42 for chilling the water. That portion of the water which is not discharged through the outflow line 52 is then sprayed into the condenser tank 4 at the spray head 10.

As one feature of the present invention, the condensation of the water vapor in the condenser tank creates a slight vacuum relative to the vaporizer tank. This difference in pressure aids in drawing the vapor from the vaporizer tank into the condenser tank.

It is thus possible to greatly increase the rate of water removal because of the increased heat transfer derived from the spraying of the mixture in the vaporizer tank and the spraying of the cooled condenser water in the condenser tank. The relative vacuum in the vaporizer and condenser tanks created by the vacuum pump 26 reduces the temperature at which the water will boil, thereby decreasing the amount of heat input necessary into the system, as well as reducing the danger of heating damage to the components of the mixture. The heat exchangers 42 and 47 assure that residual heat in system can be used to preheat the incoming mixture and to cool the recirculating condensing water, thereby further decreasing the necessary quantity of outside heating energy.

The above embodiment is not limited to the stripping of water from transformer oil, but is usable to strip any component which has good lubricating qualities and can be pumped.

Obviously, numerous modifications and variations of the present invention are possible in light of the above teachings. It is therefore to be understood that within the scope of the appended claims, the invention may be practiced otherwise as specifically described herein.

What is claimed as new and desired to be secured by Letters Patent of the United States is:

1. A method for the selective distillation of a first liquid from a mixture of said first liquid and a second liquid, said first liquid having a lower boiling point than said second liquid, said method comprising the steps of:

evacuating a first sealed chamber;

positioning a first spray head near the top of said first chamber;

heating said mixture in a heater;

conveying said heated mixture, under pressure, to said first spray head for spraying fine droplets of said mixture into said first chamber whereby a portion of said first liquid is evaporated;

withdrawing the vapor of said portion of said first liquid from said first chamber;

collecting the remainder of said mixture at the bottom of said chamber;

recirculating said remaining mixture to said heater in a recirculation loop;

introducing a supply of fresh mixture from an outside source into said recirculation loop;

sensing a temperature of said mixture in said recirculation loop; and using controller means for controlling a rate of supply of said fresh mixture from said outside source as a function of said sensed temperature.

2. The method of claim 1 wherein said first liquid is water and said second liquid is oil.

3. The method of claim 2 including the steps of:

communicating said first sealed chamber with a second sealed chamber, whereby said vapor can communicate with said second sealed chamber;

providing a supply of water;

discharging said water through a second spray head to spray fine droplets of said water into said second chamber, whereby said vapor is condensed into water by said water from said second spray head;

collecting sprayed and condensed water at the bottom of said second chamber to form said supply of water;

recirculating said collected water to said second spray head; and cooling said recirculating water.

4. The method of claim 1 wherein said rate of supply is increased in response to an increase in said sensed temperature.

5. The method of claim 1, wherein said supply of said fresh mixture is introduced into said recirculation loop at a point upstream of said heater.

6. The method of claim 1 including the steps of:

monitoring a level of said collected remaining mixture; and discharging said remaining mixture from said recirculation loop as a function of said level, so as to maintain said level at a constant value.

7. The method of claim 6 wherein said mixture is discharged from said recirculation loop at a point upstream of a point of introduction of said fresh mixture into said loop.

8. The method of claim 7, wherein said supply of said mixture is introduced into said recirculation loop at a point upstream of said heater.

9. An apparatus for the selective distillation of a first liquid from a mixture of said first liquid and a second liquid, said first liquid having a lower boiling point than said second liquid, said apparatus comprising:
a first vessel defining a first sealed chamber for holding said mixture;
means for evacuating said first sealed chamber;
a first spray head positioned near the top of said first chamber;
a first recirculation conduit connected between the bottom of said first chamber and said first spray head;
first pump means in said first conduit;
heating means in said first conduit for heating a mixture therein, whereby said mixture in said first chamber is recirculated to said first spray head and vaporized;
a second feed conduit having one end communicating with a source of said mixture and a second end communicating with said first conduit at a point upstream of said heating means; and
second pump means in said second conduit for pumping said mixture from said source to said first conduit.

10. The apparatus of claim 9 including:
temperature sensor means including control means in said first conduit at a position between said first spray head and said heating means;
a third bypass conduit connected to said second conduit on the upstream and downstream ends of said second pump means; and
first valve means in said second conduit at a position downstream of said second pump means, said first valve means being operable to open and close said second conduit in response to a signal from said control means of said temperature sensor means.

11. The apparatus of claim 9 including:
first fluid level detecting and control means associated with said first vessel;
a fourth discharge conduit having one end communicating with said first conduit at a point upstream of said second conduit;
second valve means in said fourth conduit and operable to open and close said fourth conduit in response to a signal from said first fluid level detecting and control means.

12. The apparatus of claim 9 including:
a second vessel defining a second sealed chamber;
a fifth conduit communicating upper portions of said first and second chambers; and
second fluid level detecting means associated with said second vessel.

13. The apparatus of claim 12 including:
a secondary spray head positioned near the top of said second chamber;
a sixth recirculation conduit connected between the bottom of said second chamber and said second spray head;
means for cooling a liquid in said sixth recirculation; conduit and
third pump means in said sixth conduit, whereby liquid in said second chamber is cooled then recirculated to said second spray head for condensing.

14. The apparatus of claim 9 including:
a seventh discharge conduit having one end connected to said sixth circuit; and
third valve means in said seventh conduit and operable to open and close said seventh circuit in response to a signal from said second fluid level detecting and control means.

* * * * *